(No Model.) 2 Sheets—Sheet 1.
A. CALDWELL.
DISK ATTACHMENT FOR CULTIVATORS.
No. 501,916. Patented July 25, 1893.
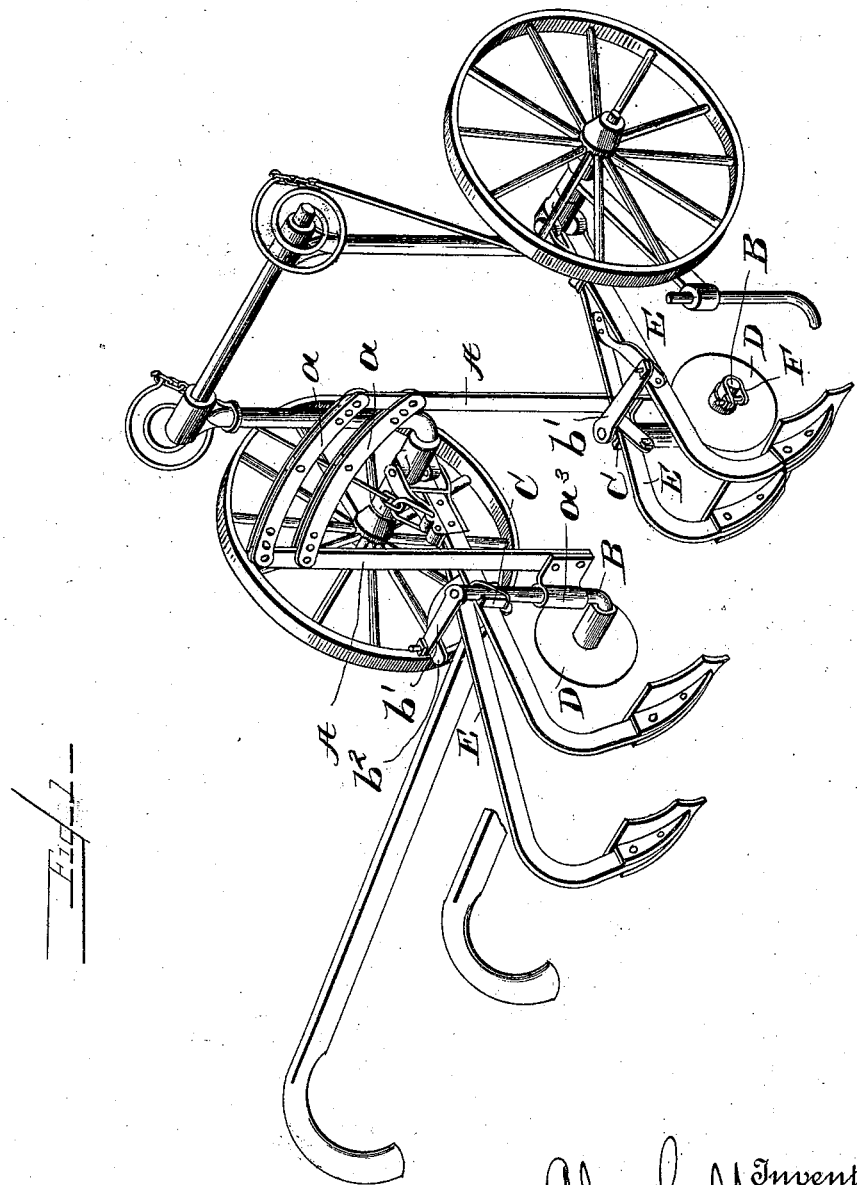

(No Model.) 2 Sheets—Sheet 2.
A. CALDWELL.
DISK ATTACHMENT FOR CULTIVATORS.
No. 501,916. Patented July 25, 1893.
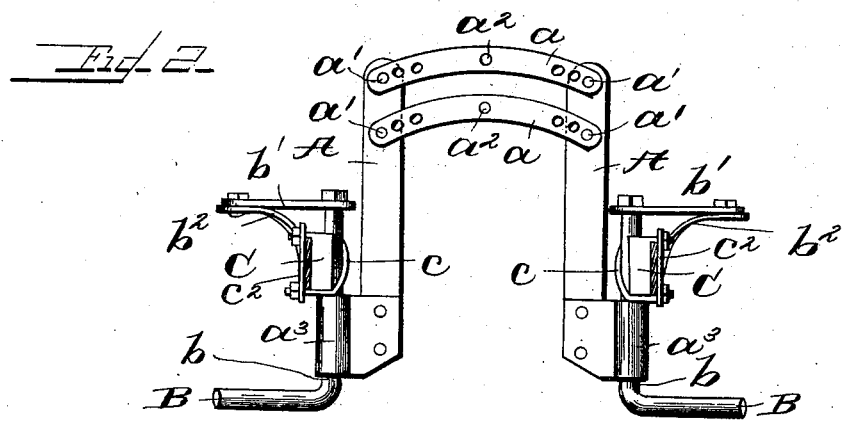
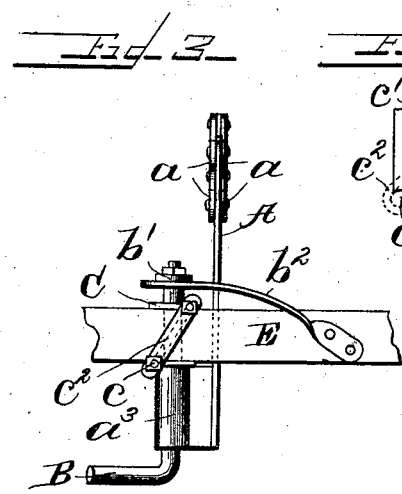
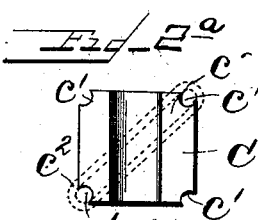
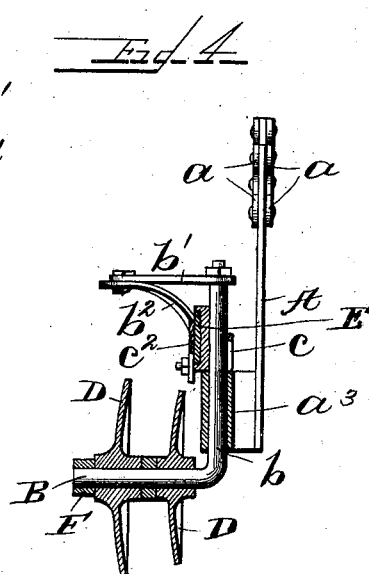
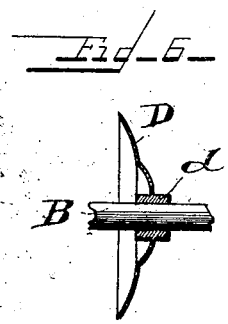
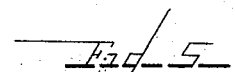
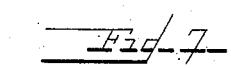
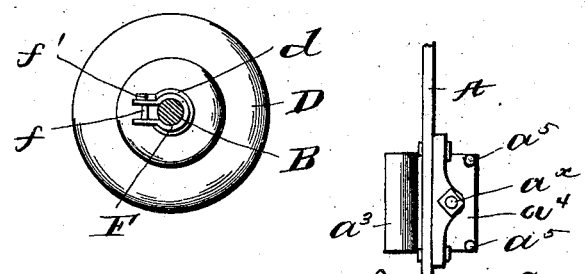
Witnesses
Inventor Alex Caldwell
By Whitaker & Prevost
Attorneys

UNITED STATES PATENT OFFICE.

ALEXANDER CALDWELL, OF ESSEX, IOWA.

DISK ATTACHMENT FOR CULTIVATORS.

SPECIFICATION forming part of Letters Patent No. 501,916, dated July 25, 1893.

Application filed October 5, 1892. Serial No. 447,913. (No model.)

*To all whom it may concern:*

Be it known that I, ALEXANDER CALDWELL, a citizen of the United States, residing at Essex, in the county of Page and State of Iowa, have invented certain new and useful Improvements in Disk Attachments for Cultivators; and I do hereby declare the following to be a full, clear, and exact description of the invention, such as will enable others skilled in the art to which it appertains to make and use the same.

My invention is a disk attachment for cultivators and consists in the novel features of construction and combination of parts hereinafter fully described, reference being had to the accompanying drawings which illustrate one form in which I have contemplated embodying my invention and my said invention is fully disclosed in the following description and claims.

Referring to the said drawings: Figure 1 represents a walking cultivator having my attachment applied thereto. Fig. 2 is a view of the attachment, with the disks removed. Figs. $2^a$, 3, 4, 5, 6 and 7 are detail views of parts of the attachment.

The object of my invention is to provide a disk attachment which can be cheaply made and which can be readily attached to any of the ordinary makes of cultivators to be used instead of or as supplemental to the cultivator plows or shovels.

In Fig. 1 of the drawings I have shown my attachment applied to an iron beam walking cultivator the plow beams of which are constructed to move vertically and backward and forward independently of each other, my attachment being so constructed that when applied it does not interfere with these independent movements of the plow beams.

My improved attachment is shown in detail in Fig. 2, the disks being removed.

A A represent two vertical standards united at their upper ends by one or more cross bars $a$ $a$ which are pivotally connected to the standards at $a'$ $a'$ forming an arch construction. The cross bars $a$ $a$ are preferably provided with a series of apertures as shown so that the standards A A may be set at different distances apart to accommodate the positions of the cultivator beams to which they are attached as will be presently described, and for greater strength I prefer to make each cross bar double, as shown in Figs. 3 and 4, and connect the two parts together by one or more central bolts or rivets $a^2$.

The lower ends of standards A A are provided with vertically disposed sleeves or collars $a^3$ $a^3$ which receive and loosely engage the vertical portions $b$ of the L-shaped axles B, upon which the disks are mounted. The said vertical portions $b$ of the axles are provided each with means for securing it to the beam of the cultivator. In this instance I have shown the part $b$ provided with a block C having a groove or recess to receive the same, and a staple bolt $c$ for engaging the part B and the block and clamping them to one of the plow beams. The block C is preferably formed as shown with recesses or notches $c'$ $c'$ at its corners to receive the arms of the staple bolt and prevent the block from moving laterally. The face of the block C which engages the plow beam, is made to conform to the configuration of the beam where convenient and the opposite face of the beam is engaged by a bar $c^2$ through which the arms of the staple bolt pass and said bolt arms are provided with nuts in the usual manner. The block C will engage the upper end of the sleeve and will prevent the stem or portion $b$ from becoming disengaged from said sleeve, or said stem may be maintained in position by suitable collars, in a well known way, if desired.

The upper end of each of the stems $b$ is provided with a laterally extending adjusting arm $b'$ rigidly secured to the said stem $b$ and the axle B and disks D D are held in any desired position by an arm $b^2$ secured to the plow beam at one end and having its opposite end provided with a series of apertures by means of which the arm $b'$ may be secured thereto in different positions.

In the figures, E E represent the plow beams, to which the stems of the axles B B are secured in the manner heretofore described.

The particular form of cultivator shown in Fig. 1 forms no part of my present invention and will not be particularly described.

When my attachment is applied the ordinary plows or shovels will be removed, but they may be used together if desired.

I prefer to employ disks D formed as shown in detail in Figs. 5 and 6 provided with a sleeve or collar $d$ to engage and revolve upon the axle B. Adjacent to the sleeve or collar $d$ the disk is given a bell shaped crown, the cutting portion of the disk making a decided angle with the outer portions of the crown. This construction gives better results in the soil than the ordinary form of disk and is a very light and strong construction.

One, two or more disks may be placed upon each axle B as may be found most effective for the work to be done and I provide means for securing the disks in position upon said axle so that any number may be employed. To this end each axle is provided with a clamping collar F composed of a piece of metal bent around the axle and having its ends secured together so as to clamp the axle by means of a bolt and nut $f f'$ as shown in Fig. 5. By the use of this clamping collar, one, two or three or even more of the disks D may be placed upon the axle B which will be made long enough to accommodate a certain number, and the clamping collar will be secured at the end of the axle adjacent to the last disk thus securing them in place.

In Fig. 1 I have shown but one disk employed and in such case the attachment may be used advantageously as a marker. In Fig. 4 I have shown the axle provided with two disks.

It will be seen that my attachment will accommodate itself to the different movements of the cultivator to which it is attached. In the form shown in Fig. 1, the attachment by reason of the pivoted cross bars $a\ a$, will allow each plow beam to rise and fall independently of the other, and the pivotal connections between the arch and the stems of the axles will permit either beam to move forward or backward.

While I have shown my attachment applied to a walking cultivator provided with metal beams, it is obvious that it may be applied to a wooden beam cultivator as well, and by slightly modifying the connecting devices it may be applied to any form of shovel cultivator with which it could be advantageously employed.

In Fig. 7 I have shown one of the standards A and sleeve $a^3$ secured together by a pivot pin $a^x$ so that the parts will adapt themselves more readily to the movements of the beams. I prefer to provide the plate $a^4$ to which the sleeve $a^3$ is attached with stops or lugs $a^5$ to engage the standard A and prevent the parts from moving too much with respect to each other. These lugs also maintain the standards A in vertical position.

My improved attachment may also be used with riding cultivators advantageously, in which case I prefer to employ two disks as shown in Fig. 4. The rider will be enabled to easily control the movements of the disks and secure their working at the proper depth by pressing upon the beams with his feet.

What I claim, and desire to secure by Letters Patent, is—

1. A disk attachment for cultivators comprising among its members the disk, its supporting axle having a vertically disposed stem, devices for securing said stem to the cultivator for the disk to cooperate with the cultivator shovels, a laterally extending arm secured to the said axle stem and an adjustable connection between said arm and the frame of the cultivator whereby the axle stem can be turned and secured to adjust the disk to the proper position, substantially as described.

2. A disk attachment for cultivators comprising among its members a pair of disk supporting axles, devices for removably securing said disks and axles to a cultivator for use with the same, said axles being connected by an arch construction pivotally connected with each whereby said disks are held a certain distance apart but are permitted an independent forward and backward movement, substantially as described.

3. The combination with a walking cultivator having independently movable plow or cultivator beams, of two disks and their supporting axles, devices for securing said axles to the cultivator beams, means for adjusting said disks at different angles to the line of draft and an arch construction having its lower ends pivotally connected with said axles to permit independent back and forward movement, the vertical portions of said arch being connected at the top to permit independent vertical movement, substantially as described.

4. An attachment for cultivators comprising a pair of disk supporting axles having vertically disposed stems securing devices for securing said stems to the cultivator beams, a pair of vertical standards having their lower ends pivotally secured to the said stems, and their upper ends connected by cross bars pivotally secured thereto, substantially as described.

5. An attachment for cultivators comprising a pair of disk supporting axles having vertically disposed stems securing devices for securing said stems to the cultivator beams, a pair of vertical standards having their lower ends pivotally secured to said stems adjustable cross bars pivotally secured to their upper ends, substantially as described.

In testimony whereof I affix my signature in presence of two witnesses.

ALEX. CALDWELL.

Witnesses:
L. A. TOMPKINS,
F. HOOKER.